Sept. 17, 1968　　　A. SCHMERMUND　　　3,401,585
CUTTING ARRANGEMENTS FOR CUTTING LONGITUDINALLY MOVING WEBS Filed March 25, 1966　　　3 Sheets-Sheet 1

INVENTOR:
ALFRED SCHMERMUND
By: Nolte & Nolte
ATTORNEYS

Sept. 17, 1968   A. SCHMERMUND   3,401,585
CUTTING ARRANGEMENTS FOR CUTTING LONGITUDINALLY MOVING WEBS
Filed March 25, 1966
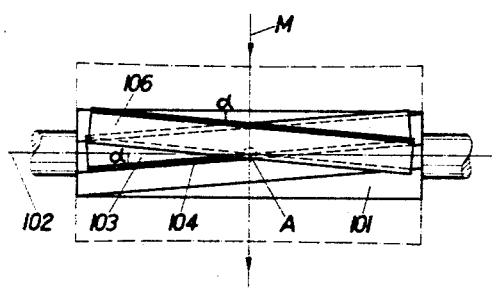
Fig. 5
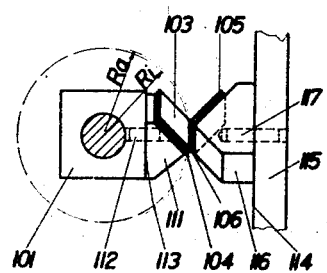
Fig. 6
Fig. 10
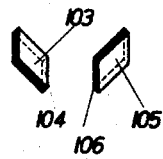
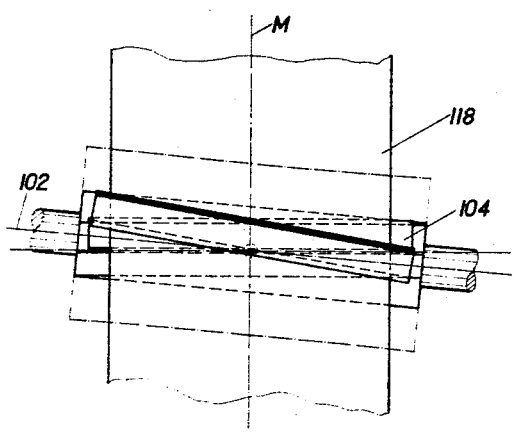
Fig. 7
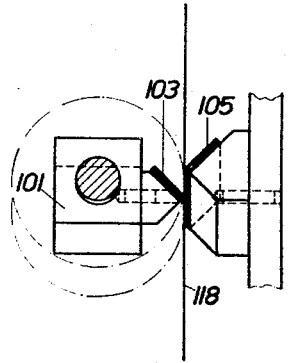
Fig. 8
INVENTOR:
ALFRED SCHMERMUND
By: Malle & Malle
ATTORNEYS Sept. 17, 1968  A. SCHMERMUND  3,401,585
CUTTING ARRANGEMENTS FOR CUTTING LONGITUDINALLY MOVING WEBS
Filed March 25, 1966  3 Sheets-Sheet 3

INVENTOR:
ALFRED SCHMERMUND
By: Malte & Malte
ATTORNEYS

United States Patent Office 3,401,585
Patented Sept. 17, 1968

3,401,585
CUTTING ARRANGEMENTS FOR CUTTING
LONGITUDINALLY MOVING WEBS
Alfred Schmermund, 62 Kornerstrasse,
Gevelsberg, Westphalia, Germany
Filed Mar. 25, 1966, Ser. No. 537,370
Claims priority, application Great Britain, Mar. 31, 1965,
13,541/65
4 Claims. (Cl. 83—341)

ABSTRACT OF THE DISCLOSURE

The disclosure relates to cutting arrangements for cutting longitudinally moving webs into predetermined lengths as are used, for example, for wrapping cigarette blocks. The arrangement comprises a rotatable cutter having a cutting edge which cooperates with a counter-edge. In order to avoid a chopping action of the cutting edge and to achieve a slicing cut which begins at one margin of the web and proceeds to the other margin, a rectilinear cutting edge and a rectilinear counter-edge are provided on a rotatable cutter and a counter member respectively, the cutter and counter member being inclined at equal angles, but in opposite senses, relative to the axis of rotation of the cutter. A specific arrangement for mounting the cutter and counter member, for rotating the cutter and for moving a web between the cutter and counter member is described in detail.

---

The present invention relates to cutting arrangements for cutting longitudinally moving webs.

Cutting arrangements have been proposed which comprise a cutter roller provided with a cutter and adapted to cooperate with a counter-roller for cutting a moving paper web or the like arranged therebetween. In the simplest case the rollers are rotatable about axes which extend transversely to the direction of travel of the web and the cutting edge of the cutter extends parallel to these axes. Thus, the entire cut is effected instantaneously and high cutting pressures are necessary. On account of the chopping action by which the cut is effected, the cutting edge is liable to be damaged.

Arrangements have also been proposed in which, for achieving a slicing cut which begins at one margin of the web and proceeds to the other margin, the cutter is arranged with askew inclination relative to the axis of rotation of the cutter roller and is ground so that the cutting edge lies in a cylindrical plane. Grinding and regrinding of such cutters is difficult and those arrangements are therefore expensive, both initially and with regard to maintenance.

In my United States Patent No. 3,203,292, issued Aug. 31, 1965, I have described a cutting arrangement having a rotatable cutter with a rectilinear cutting edge co-operating with a rotatable counter-roller having a cylindrical surface arranged to contact the cutting edge progressively along its length, the axes of rotation of the cutter and the counter-roller having different inclinations relative to the direction of travel of the web, and the cutting edge of the cutter having a skew inclination relative to the axis of rotation of the cutter.

It is an object of the present invention to provide a novel and improved cutting arrangement for cutting a longitudinally travelling web by a cut made progressively from one side to the other of the webs and by means of which a wear of the cutting edge can be reduced.

The present invention envisages a cutting arrangement for cutting a longitudinally travelling web comprising a cutter having a rectilinear cutting edge and rotatable about an axis of rotation for cutting the web in co-operation with a counter member, the cutter and the counter member being inclined at equal angles but in opposite senses relative to the axis of rotation of the cutter.

Further objects and advantages of the present invention will become apparent to those skilled in the art from the following description when read with reference to the attached drawings, which are given by way of example and in which:

FIG. 5 illustrates a cutting arrangement of the invention in plan view;

FIG. 6 illustrates a side view of the arrangement of FIG. 5;

FIGS. 7 and 8 are similar to FIGS. 5 and 6 but show the arrangement positioned in a different way;

Figure 9:
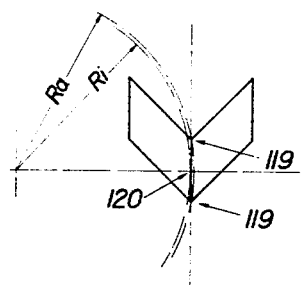

FIGS. 9 and 10 serve explanatory purposes; and

Figure 11:
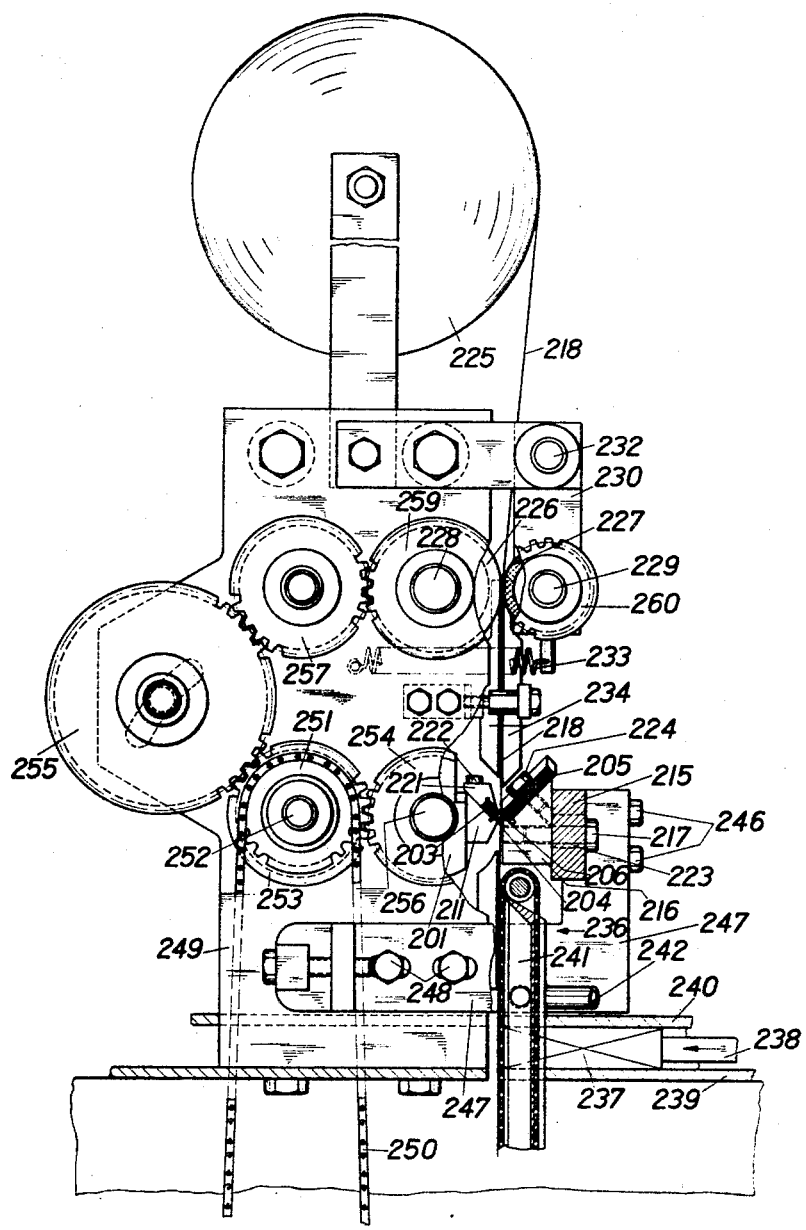

FIG. 11 shows a side view of a further cutting arrangement.

Figure 1:
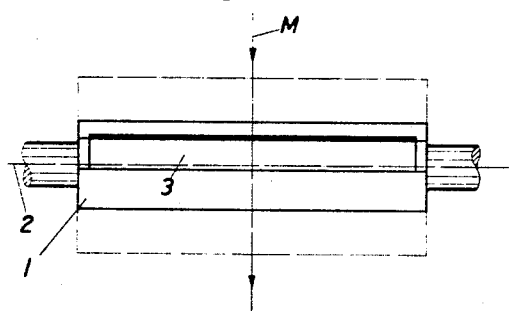
FIG. 1 illustrates a cutting arrangement in plan view and serves explanatory purposes.
Figure 2:
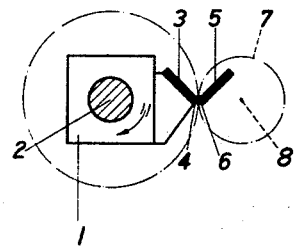
FIG. 2 illustrates a side view of the arrangement of FIG. 1.

The cutting arrangement of FIGS. 1 and 2 comprises a cutter support 1 rotatable about an axis of rotation 2. On the support 1, a cutter 3 is mounted which has a rectilinear cutting edge 4 which cooperates with a rectilinear counter-edge 6 of a stationary member 5. The cutting edge 4 and the counter-edge 6 are parallel to each other and to the axis of rotation 2. It will be recognised that when a paper web travels in the direction M between the cutter 3 and the member 5 it is cut at regular intervals by the cutting edge 4 co-operating with the counter-edge 6. However, each cut is effected instantaneously across the entire width of the web. Such a cut causes a chopping action which places a great strain on the co-operating edges 4 and 6 and may lead to the cutting edge becoming blunt in a short time. As is known such a chopping action is undesirable. In practice, a sliding cut is desired, by which a web is cut progressively from one edge thereof to the other.

Figure 3:
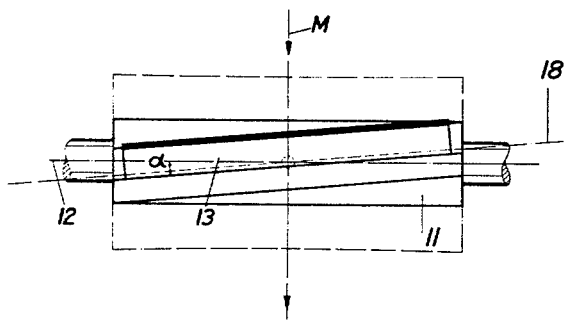
FIG. 3 illustrates another cutting arrangement in plan view and serves explanatory purposes.
Figure 4:
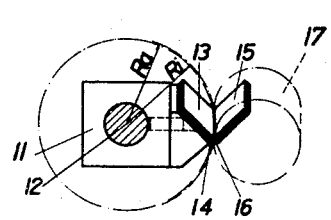
FIG. 4 illustrates a side view of the arrangement of FIG. 3.

The arrangement of FIGS. 3 and 4, wherein parts similar to those of FIGS. 1 and 2 have been indicated by the same reference numerals increased by ten, corresponds generally to the arrangement of FIGS. 1 and 2, except that a cutting edge 14 of the cutter 13, which is mounted on the cutter support 11 and is rotatable about the axis of rotation 12, and the counter-edge 16 of the member 15 are both turned through an angle α. Both cooperating edges are, again, parallel to each other and the cut is performed by a chopping action, in the same manner as with the arrangement of FIGS. 1 and 2. It should be noted that the member 5 or 15 and its counter-edge 6 or 16 could be replaced by an idling roller as indicated in broken lines in FIG. 2 at 7, and in FIG. 4 at 17, such roller being rotatable about a second axis of rotation indicated at 8 in FIG. 2 and at 18 in FIG. 3.

The arrangement of FIGS. 5 and 6 comprises a cutter support 101 rotatable about an axis of rotation 102. The cutter support 101 carries a holder 111 fixed to the cutter support 101 by means of an adjustable screw 112. The holder 111 carries a cutter 103 having a rectilinear cutting edge 104. The cutting edge 104 cooperates with a rectilinear counter-edge 106 of a stationary member 105. The cutter support 101 has a plane surface 113 which, when the midpoint of the cutting edge 104 is adjacent the midpoint of the counter-edge 106 as indicated at A in FIG. 5 is parallel to a plane surface 114 of a stationary support in the form of a wall or frame 115 as shown in FIG. 6. On the wall or frame 115 is mounted a holder 116 for the member 105, the holder 116 being adjustable by a screw 117 for varying the inclination of the counter-edge 106 relative to the axis 102. The cutting edge 104 is turned about its midpoint A through an angle α, as was the cutting edge 14 of the arrangement of FIG. 3, but contrary to the arrangement of FIG. 3, in the arrangement of FIGS. 5 and 6 the counter-edge 106 is turned about the point A through an angle α in a sense opposite to that through which the cutting edge 104 is turned. (See also FIG. 10 showing the cutter 103 and the member 105 at a distance from each other.) In this case, a progressive cut is obtained. In other words, if the cutting edge 104 and the counter-edge 106 contact each other at one point (after cutting through the paper web between them), such point of contact, on rotation of the cutting edge 104 passes progressively along the entire cutting edge 104 from one end thereof to the other.

In practice, it has been found that in order to obtain a clean cut of a paper web the cutting edge 104 and the counter-edge 106 need not make contact with each other. A clean cut may be obtained when the nearest opposed points of the two cooperating edges 104 and 106 are spaced apart by about 1/1000 of a millimetre. It is obvious that with such an arrangement any blunting of the cutting edge 104 due to contact with the counter-edge 106 may be avoided.

In the arrangement of FIG. 5 owing to the inclination of the cutting edge 104, a web is cut in a direction inclined to the direction M of travel of the web. If it is desired to obtain a cut perpendicular to the direction M the entire cutting arrangement as a unit is to be turned as shown in FIGS. 7 and 8 so that the cutting edge 104 is prependicular to the direction M of travel of the web 118. In general the cut is effected at that angle which exists between the cutting edge 104 and the direction of travel of the web 118.

Owing to the inclination of the cutting edge 104 relative to the axis of rotation 102, the ends of the cutting edge, indicated by reference numerals 119 in FIG. 9, rotate along a circle of slightly greater radius $Ra$ than the radius $Ri$ of the circle of rotation of the midpoint of the cutting-blade, which is indicated by reference numeral 120 in FIG. 9. Therefore the peripheral speed $Va$ of the ends of the cutting edge 104 is greater than the speed $Vi$ of the midpoint of the cutting edge 104.

In order to obtain a clean cut of the paper web, the web should travel with a speed $$V = \frac{Va + Vi}{2}$$

that is to say the speed of travel of the web should be the means of the speed of an end of the cutting edge 104 and that of its midpoint.

Again, the cutter support 101 carrying the cutter may be replaced by a rotatable roller carrying the cutter. If desired, more cutters than one may be provided on the rotatable cutter support 101 or on the rotatable roller replacing the cutter support. For example, in the arrangement of FIGS. 5 and 6 a cutter may be provided on each of the four surfaces of the cutter support 101.

The cutting device illustrated in FIG. 11 is similar to that of FIGS. 7 and 8, and has a rotatable cutter support 201 carrying a cutter 203. A rectilinear cutting edge 204 on the cutter 203 cooperates with a rectilinear counter-edge 206 on a stationary member 205.

The cutter 203 is retained on a cutter holder 211 by a cutter retainer 221 secured by screws 222, of which only one can be seen in the drawing. The cutter holder 211 is adjustable in the same manner as described above with reference to the holder 111 of FIG. 6 for varying the inclination of the cutting edge 204. Since the cutter 203 is held on the holder 211 by means of the retainer 221, the cutter 203 can be adjusted in its own plane to take up any space between the cutting edge 204 and the holder 211 when material has been removed from the cutter 203 by re-sharpening. The stationary member 205 is carried by a holder 216 which is adjustably secured to a support bar 215 by means of bolts 217, of which only one can be seen. The bolts 217 are in threaded engagement with the holder 216 and extend through slots 223 in the support bar 215 to allow vertical adjustment of the holder 216 and thus of the stationary member 205 relative to the support bar 215 for varying the inclination of the counter-edge 206.

A web 218 of packaging material is fed from a reel 225 downwardly between a pair of feed rollers 226 and 227. The roller 226 is rotatable about a shaft 228 having a fixed axis, while the feed roller 227 is rotatable about a shaft 229 carried on a pair of pivotable arms 230, of which only one is illustrated. The arms 230 are pivotable about a shaft 232 under the action of a tension spring 233 which urges the roller 227 towards the roller 226.

From the rollers 226 and 227 the web 218 passes downwardly between guides 234 and between the cutter 203 and the stationary member 205 to a suction conveyor indicated generally by reference numeral 236. As the cutter support 201 rotates, the web 218 is cut transversely of the length thereof into sections, each of which is held by the suction conveyor 236 until a block of cigarettes 237 is pushed by a pusher member 238 between guide plates 239 and 240 against the section of the web 218 held by the suction conveyor 236, whereupon this section is wrapped around the block 237.

The suction conveyor 236 comprises at each side of the path of the block 237 a suction chamber 241 open at one side as shown and connected to an exhaust pipe 242, a perforated endless belt 244 being driven around the suction chamber 241. The suction conveyor 236 and the means for wrapping the web sections around the blocks 237 do not form part of this invention and will therefore not be described in greater detail.

The support bar 215 is secured by bolts 246 at opposite ends thereof to two L-shaped brackets 247, which in turn are secured by bolts 248 to side walls 249 of the device, only one of the side walls 249 being visible in FIG. 11.

The arrangement of the cutter 203, its support 201 and the stationary member 205 is similar to the arrangement described above with reference to the FIGS. 7 and 8; that is to say, the cutting edge 204 extends perpendicular to the longitudinal direction of the web 218, and the cutting edge 204 and the counter-edge 206 are both inclined relative to the axis of rotation of the cutter support 201, which is itself inclined relative to the horizontal, the inclination of these two edges relative to the axis of rotation of the cutter support 201 being equal but in opposite senses.

For transmitting drive to the above-described device, a drive means in the form of a drive chain 250 engages around a drive sprocket 251. A shaft 252 journalled in the side walls 249 of the device is secured to the drive sprocket 251 and a gear wheel 253, which meshes with gear wheels 254 and 255.

The gear wheel 254 is secured to an inclined shaft 256 journalled in the side walls 249 and carrying the cutter support 201, while the gear wheel 255 meshes with a gear wheel 257, which in turn meshes with a gear wheel 259 secured to the shaft 228 of the feed roller 226. The gear wheel 259 also meshes with a gear wheel 260 secured to the shaft 229 of the feed roller 227 for rotating the feed roller 227.

The drive chain 250 and the gear wheels driven therefrom a common drive transmission for rotating the cutter 203 and feeding the web 218, the transmission being such that the speed of travel of the web 218 is equal to the mean of the peripheral speeds of the midpoint and an end of the cutting edge 204.

The operation of the device of FIG. 11 is as follows:
The paper web 218 is drawn from the reel 225 by the feed rollers 226 and 227, which are rotated in timed relation with the rotation of the cutter 203. From the feed rollers 226 and 227, the paper web 218 travels between the guides 234 and between the cutter 203 and the stationary member 205 to the suction conveyor 236.

Due to the above-described inclination of the cutting edge 204 and the counter-edge 206 relative to the axis of rotation of the cutter support 201, the paper web 218 is cut progressively across the width thereof along a line of cut extending perpendicular to the direction of travel of the paper web 218.

The cut section of the paper web 218 is then wrapped around the cigarette block 237 as described above.

Modifications in the above described device are possible. For example, the stationary member 105 or 205 may be replaced by an idling roller rotatable about an axis inclined to the axis of rotation of the cutter in the opposite sense to, but at the same angle as, the cutting edge.

It should be clearly understood that the embodiments of the present invention hereinbefore described are given only by way of example. Modifications, omissions and additions are possible without departing from the spirit of the invention.

I claim:

1. A cutting arrangement for cutting a longitudinally travelling web, comprising a cutter, a rectilinear cutting edge on said cutter, and a counter member, said cutter being rotatable about an axis of rotation for cutting said web in co-operation with said counter member, and said cutter and said counter member being inclined at equal angles, but in opposite senses, relative to said axis of rotation, wherein cutter support means rotatable about said axis of rotation are provided for supporting said cutter, a first plane surface is formed on said cutter support means, said first plane surface extending parallel to said axis of rotation, means on said first plane surface for holding said cutter are adjustable for varying the position of said holding means on said first plane surface to adjust the inclination of said cutting edge relative to said axis of rotation, said counter member has a rectilinear counter-edge for cutting said web in cooperation with said cutter, fixed support means are provided for supporting said counter member, a second plane surface is formed on said fixed support means, means on said second plane surface for holding said counter member are adjustable for varying the position of said counter member holding means on said second plane surface to vary the inclination of said counter-edge relative to said axis of rotation, said first and second plane surfaces being parallel to each other when the midpoint of said cutting edge is adjacent the midpoint of said counter-edge.

2. A cutting arrangement as defined in claim 1, and further comprising drive means for rotating said cutting edge about said axis of rotation such that the ends of said cutting edge, owing to its inclination, being rotated at a higher peripheral speed than the midpoint of said cutting edge and that the mean of the peripheral speeds of the midpoint and one end of said cutting edge is substantially equal to the speed of travel of said web.

3. A cutting arrangement as defined in claim 1, wherein said cutter is mounted for rotation around a path which is spaced from said counter member to prevent said cutting edge from contacting said counter member after said cutting edge has cut said web, said path extending sufficiently close to said counter member to cause said web to be severed as said cutting edge passes said counter member.

4. A cutting arrangement for cutting a longitudinally travelling web, comprising a cutter, a rectilinear cutting edge on said cutter, and a counter member, said cutter being rotatable about an axis of rotation for cutting said web in co-operation with said counter member, and said cutter and said counter member being inclined at equal angles, but in opposite senses, relative to said axis of rotation, wherein feed means are provided for feeding said web past said counter member, drive means are provided for rotating said cutting edge about said axis of rotation at a speed such that the mean of the peripheral speeds of the midpoint and one end of said cutting edge about said axis of rotation is substantially equal to the speed of travel of said web, said drive means being adapted to drive said feed means, first support means rotatable about said axis of rotation are provided for supporting said cutter with said cutting edge extending in a direction perpendicular to the direction of travel of said web, a first plane surface parallel to said axis of rotation is formed on said first support means, first holding means on said first plane surface for holding said cutter are adjustable for altering the position of said cutting edge relative to said axis of rotation, said counter member comprises a rectilinear counter-edge adapted to cut said web in co-operation with said cutting edge, second support means are provided for supporting said counter member, a second plane surface is formed on said second support means, and second holding means on said second plane surface for holding said counter member are adjustable for altering the position of said counter-edge relative to said second support means, said first and second plane surfaces being parallel to one another when the midpoint of said cutting edge is adjacent the midpoint of said counter-edge.

References Cited

UNITED STATES PATENTS

| 2,399,529 | 4/1946 | Willits | 83—349 X |
| 2,586,462 | 2/1952 | Forster | 83—596 X |
| 3,203,292 | 8/1965 | Schmermund | 83—341 |

FOREIGN PATENTS 704,183   2/1954   Great Britain.

ANDREW R. JUHASZ, *Primary Examiner.*